United States Patent [19]

Brugger

[11] Patent Number: 4,799,060

[45] Date of Patent: Jan. 17, 1989

[54] TRAFFIC SIGNAL

[76] Inventor: Richard D. Brugger, 5433 Clinton Dr., Erie, Pa. 16509

[21] Appl. No.: 75,581

[22] Filed: Jul. 20, 1987

[51] Int. Cl.[4] .......................... G08G 1/095; B60Q 1/00

[52] U.S. Cl. .................................... 340/907; 340/953; 340/982; 340/50; 340/83; 340/84; 340/81 R; 315/200 A

[58] Field of Search ................ 340/907, 953, 981-983, 340/50, 83, 84, 81 R, 72, 87; 350/97-101; 315/200 A, 360, 209 R

[56] References Cited

U.S. PATENT DOCUMENTS

| | | | |
|---|---|---|---|
| 1,276,805 | 8/1918 | Parsons | 340/50 |
| 2,932,814 | 4/1960 | Wilfert | 340/83 |
| 2,947,970 | 8/1960 | Van Oosten | 340/72 |
| 3,391,304 | 7/1968 | Fabry | 340/83 |
| 3,533,059 | 10/1970 | Lambert | 340/982 |
| 3,893,041 | 7/1975 | Foster et al. | 340/83 |

OTHER PUBLICATIONS

"Usefulness of Photic Stimulation in Routine Clinical Electroencephalography", Neurology, Aug. 1960, vol. 10, No. 8, pp. 777-782.

*Primary Examiner*—Donnie L. Crosland
*Attorney, Agent, or Firm*—Charles L. Lovercheck; Wayne L. Lovercheck; Dale R. Lovercheck

[57] ABSTRACT

A traffic signal made up of a conventional stop and go configuration of lamps and switching means with an improved lamp control and improved lamps. The lamps are of the incandescent type, preferably having two filaments. The filaments are connected to a source of electrical current. The current is supplied through an electronic circuit providing electrical current of a first polarity alternately to one of the filaments and electrical current a second polarity alternately to the second filament. It has been discovered that this alternate energizating of the filaments gives a scanning effect that is more conspicuous and has greater attention getting qualities under all viewing conditions.

12 Claims, 3 Drawing Sheets

10
11
12
13
14
15
16
17
18
19
20
21
22
23
29
30
31
32
33
37

TRAFFIC SIGNAL

BACKGROUND OF THE INVENTION

It is well known that when traffic signals are illuminated by bright sunlight, it is diffult to determine their color status) red, green or amber) because the sunlight illuminates all the lenses as if they were lit electrically. Adaptations such as sun shields are used extensively, to solve this problem bu thave the intrinsic disadvantage of physical instability in high winds and limitations on viewing.

The present invention is an improvement on traffic signals, whereby a signal light is made more visible without increasing the size or the electrical power requirement. The improvement utilizes an incandescent bulb of novel design, in conjunction with an electronic circut, as improvements on existing traffic signals. The invention does not require re-design of existing associated structure.

SUMMARY OF THE INVENTION

The present invention resides in a unique combination of elements to create the strong visual sensation of a scanning beam of light from the traffic signal wihtout any actual physical motion. The first aspect of the invention is a special lamp bulb which replaces the original lamp bulb in an origianl socket. The bulb enclosure contains two filaments located in a plane normal to the major bulb axis, and displaced a distance from each other. A "polarity discriminator" is located inside the base of the bulb which enables the first or the second filament to be powered, depending upon the polarity of the voltage applied to the base of the bulb. The base of the bulb is a conventional base ordinarily used on such lamps, with an eyelet connection at the end and at the threaded side of the base.

The second aspect of the invention is an electronic circuit with attached terminals, which physically occupies the space originally occupied by the terminal block prior to the change from the conventional bulb to the bulb used herein. The function of the circuit is to deliver, in alternate manner, positive and negative voltages, for time durations of typically 50 milliseconds, whenever 120 volts AC is applied to the circuit by a principal traffic controller which sequences the colored lights. Thus, if the circuit disclosed herein is applied to the red signal assembly, as is most appropriate, the red light will appear to "scan" back and forth reathre than it soriginal static appearance. Cooperating in producing this visual result is the curved reflector, which directs the predominant beam of the instant in a direction which depends upon the location of the filament which is energized at that instant. The colored lens further enhances the visual effect, and is also the standard original part of the system.

OBJECTS OF THE INVENTION

It is an object of the invention to provide an improved traffic signal.

Another object of the invention is to provide an improved traffic light signal that is simple in construction, economical to manufacture and simple and efficient to use.

Another object of the invention is to provide an improved traffic signal equipped with bulbs having two or more filaments an electronic circuit connected to the two individual filaments which energizes the filament with positive and negative voltage at predetermined relatively short time intervals to give the optical illusion of a scanning beam and therefore increases the visibility of the light.

A primary objective of the present invention is to make the light of a traffic signal more visible to the observer through the physiological effect of making the ligth appear to "scan" in the view of the observer. The scanning involves an optical effect which gives a strong visual impression, produced through the application of electronics, optical and illumination principles.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWINGS

FIG. 8 with b shows voltage from the electronic circuit to the lamp socket.

FIG. 8 with c shows the wave shape time voltage on to the first filament.

FIG. 8 with d shows a wave shape voltage to the second filament.

FIG. 13 is a wiring diagram of another embodiment of the improved lamp bulb and circuit according to the invention.

FIG. 14 is a front view of a conventional single U-shaped filament lamp with filament on.

FIG. 15 is a side view of a conventional U-shaped filament lamp with filament on showing the light pattern.

FIG. 16 is a front view of the lamp according to the invention with first filament on and second filament off.

FIG. 17 is a view showing the light pattern of the lamp with first filament on and second filament off according to the invention with first filament on of FIG. 16.

FIG. 18 is a view of the lamp according to the invention, with the second filament on and the first filament off.

FIG. 19 is a view of the light according to the invention with the second filament on and the first filament off, showing the light pattern.

DETAILED DESCRIPTION OF THE DRAWINGS

Figures 1, 2, 3, 4, 5, 6, 7:
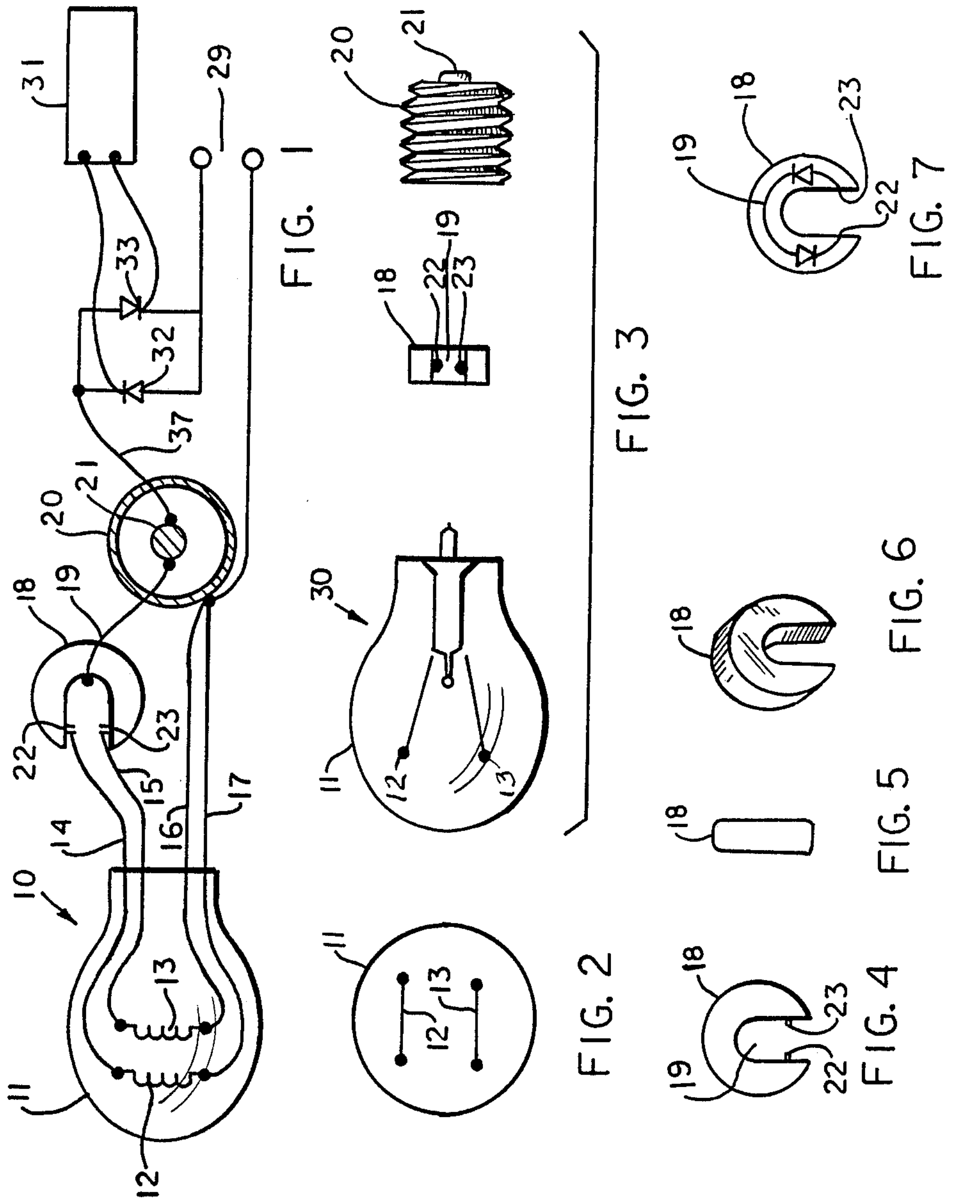
FIG. 1 is a wiring diagram of the improved lamp bulb and circuit in accordance with the present invention.
FIG. 2 is a front view of the bulb.
FIG. 3 is an exploded view of the improved bulb, showing relative positions of filaments.
FIG. 4 is a top view of the polarity discriminator,.
FIG. 5 is a side view of the polarity discriminator.
FIG. 6 is an isometric view of the polarity discriminator.
FIG. 7 is a schematic view of the polarity discriminator.
Figure 8:
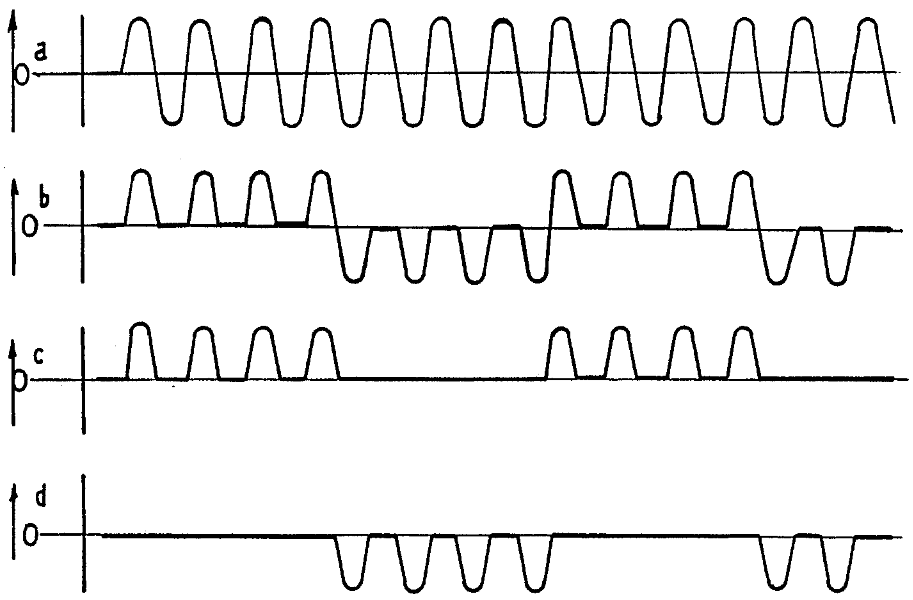
FIG. 8 with a shows the wave shape time curves of an AC line voltage.

Now with more particular reference to the drawings, an embodiment of the improvement in a traffic signal 10 is illustrated in FIGS. 1 through 12. FIG. 1 shows a glass bulb envelope 11 containing a first filament 12 and a second filament 13 mounted to the internal stem portion of the glass bulb envelope 11. Filaments 12 and 13 are shown schemtacially for clarity of disclosure. Their correct position location is shown in FIGS. 2 and 3. Wires 14 through 17 are connections through the glass bulb envelope 11 to the two filaments 12 and 13. Polarity discriminator 18 has attached wire lead 19. Wire lead 19 is attached to the eyelet 21 of threaded lamp base 20. The parts shown in the wiring diagram of FIG. 1, are shown in end view in FIG. 2. The assembled bulb 30 has attached threaded lamp base 20 with polarity discriminator 18 inside. FIG. 3 is an exploded view showing the relative positions of the two filaments 12 and 13 inside of glass bulb envelope 11. Polarity discriminator 18 is shown in FIGS. 1 and 3 through 7.

The conventional traffic signal enclosure 25 contains conventional reflector 26, supplied as original equipment, conventional colored lens 27 and conventional socket 28. The conventional reflector 26 is a concave reflector and may be spherical, parabolical or any other suitable shape. The filaments 12 and 13 will be supported parallel to each other and in a plane generally perpendicular to the principal or major axis of the conventional reflector 26. In the case of a spherical reflector, the plane passing through the filaments will be generally perpendicular to the radius of curvature passing through the center of the conventional reflector 26 which may be referred to as the principal axis. Improved glass bulb envelope 11 replaces a conventional bulb. The original terminal block is replaced by timing circuit 31. Conventional wires are connected from the conventional socket 28 to the timing circuit 31 to the original wires in from the powe source 29. The polarity discriminator 18 electrically acts as two diodes connected in series with one another with terminals 22, 23 and wire lead 19. SCR 32 has a cathode connected to the anode of SCR 33 and to power source 29. SCR 32 has an anode connected to the cathode of SCR 33 and to eyelet 21.

FIGS. **8*a* through 8*d* show wave shaped plotted as voltage versus time. FIG. 8*a* shows the input 120 volt AC power from the traffic controller. Wave shape to shows the electronics package output signal on wire 37. Curve C shows a curve of the voltage applied to wire 14 and curve D shows the curve of the voltage applied to wire 15**.

Figures 13, 14, 15, 16, 17, 18, 19:
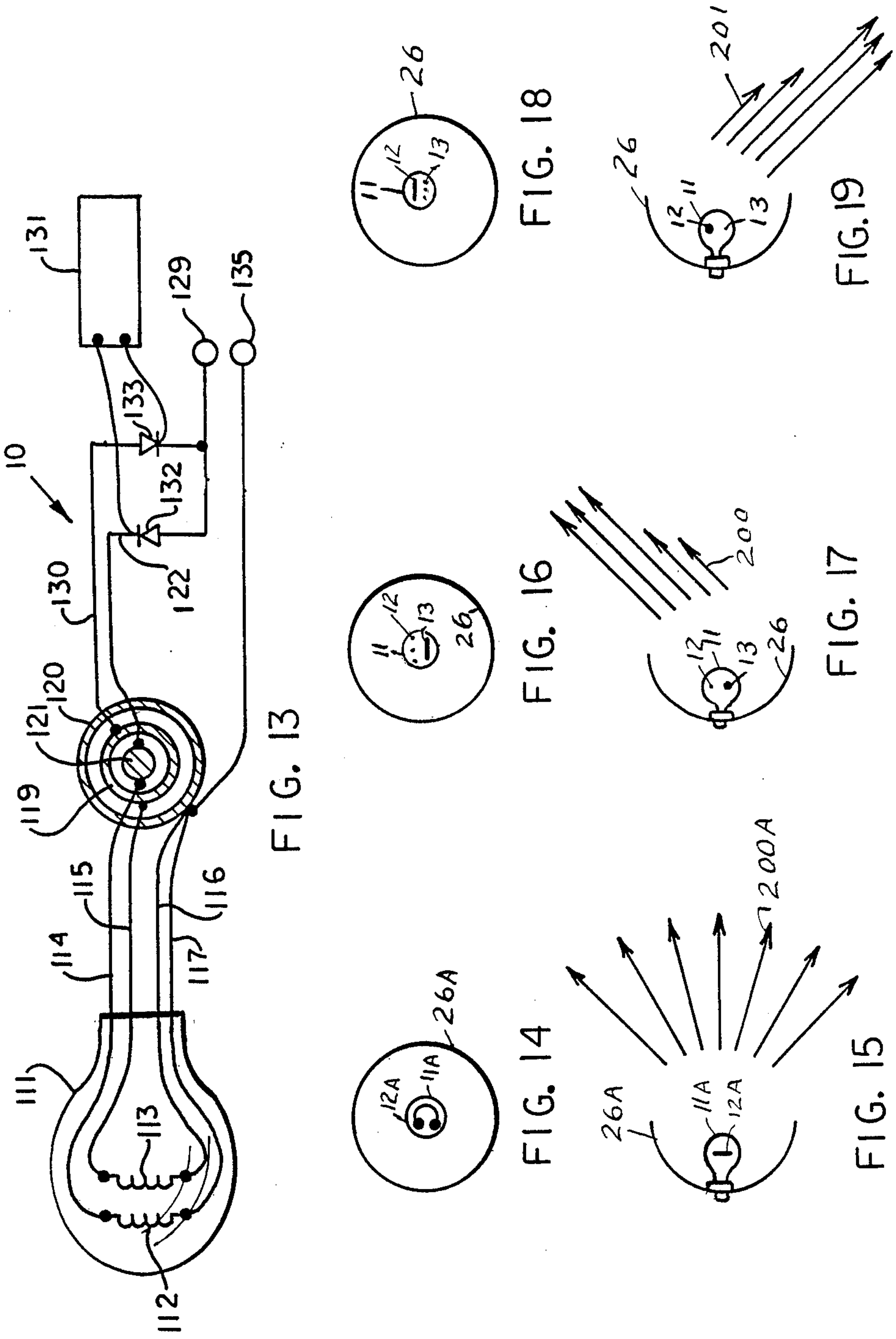

Another embodiment of the lamp circuit is shown in FIG. 13, wherein the filament locations are shown schematically for clarity of disclosure. Lamp bulb 111 encloses filaments 112 and 113. The lamp bulb 111 has threaded shell 120, eyelet 121 and intermediate terminal ring 119. Wire 114 is connected to eyelet 121. Wire 115 is connected to terminal ring 119. Wires 116 and 117 are both connected to threaded shell 120 and to terminal 135. Timing circuit 131 is connected to the gate control of SCR's 132 and 133. The anode of SCR 132 is connected to wire eyelet 121 and wire 114. The anode of SCR 133 is connected to terminal 129 and to the cathode of SCR 132. When AC power is connected to terminals 129 and 135, the timing circuit 131 will be set to alternately turn SCR 133 on and SCR 132 off for predetermined periods of time to energize filament 112 and 113 alternately. Wire 122 connects the anode of SCR 132 to eyelet 121. Wire 130 connects intermediate terminal ring 119 to the anode of SCR 133.

Figure 9:
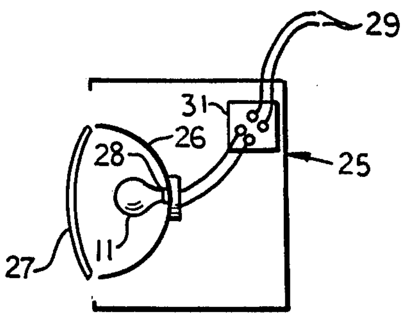
FIG. 9 is a side diagramatic view of a traffic light according to the invention.
Figure 11:
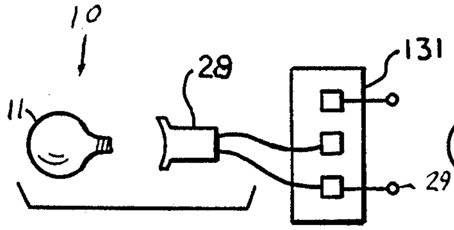
FIG. 11 is a diagramatic view of the lamp and control according to the invention.
Figure 12:
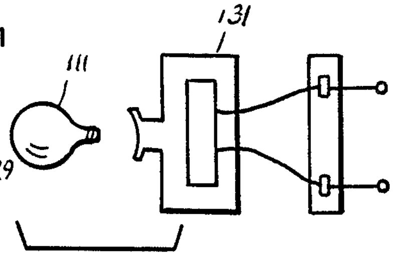
FIG. 12 is a diagramatic view of the lamp bulb and control of another embodiment.

FIGS. 9 and 11 show the first embodiment of traffic signal 10 having a conventional enclosure 25 with a reflector 26 supported in it. Reflector 26 is supported in a conventional manner. The socket 28 illustrates a socket in a conventional traffic signal where a single filament is energized continuously. Light rays are reflected from the reflector 26 in a continuous pattern, as shown in FIGS. 14 and 15. With the improved light the filaments are spaced from one another in a plane perpendicular to the longitudinal axis of the reflector, the light is reflected in a first direction as shown in FIG. 17 when the second filament is on the light is reflected in a second direction, as shown in FIGS. 18 and 19, when the filaments are turned on and off at short intervals of time, the change in direction of the reflected light gives the visual effect of scanning.

Figure 10:
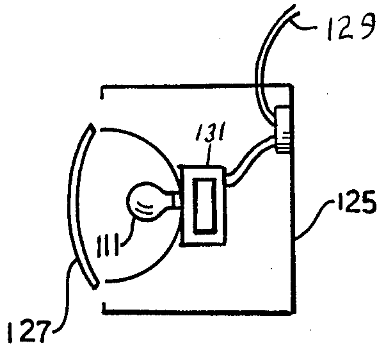
FIG. 10 is a side diagrammatic view of another embodiment of the traffic light.

FIG. 10 shows a traffic signal having bulb 111, a colored lens 127 and enclosure 125. A power source is connected to terminal 129 and to timing circuit 131.

FIGS. 14 and 15 show a conventional bulb 11a having a single filament **12*a* supported in front of a concave reflector 26*a* showing rays of light and leveraging outwardly at 200*a***.

FIGS. 16 and 17 show a lamp according to the invention having filaments 12 and 13 in which filament 13 is energized in FIGS. 16 and 17 and filament 12 is energized in FIGS. 18 and 19. Thus the light rays 200 will be reflected in a first direction in FIG. 17 and rays 201 will be directed in a second direction in FIG. 19.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an inclusive property or privilege is claimed are defined as follows:

1. In combination a traffic signal including a bulb and a curved reflector, said bulb having a major axis extending through said cruved reflector and an electronic circuit, said bulb having at least two filaments, means supporting said filaments in said bulb in spaced, generally aprallel, relation to each other and in a plan normal to said major axis whereby said curved reflector directs a predominant beam of light from each said filaments, said electronic circuit having switching means to energize said filaments alternately for predetermined periods of time to project light from said reflector alternately at a first angle to said major axis and then at a second angle to said major axis, whereby said beam of light reflected from said curved reflector produces a visual image of scanning.

2. The combination recited in claim 1 wherein said traffic signal has a lens, said filaments are disposed between said lens and said curved reflector.

3. The combination recited in claim 1 wherein said filaments comprise a first filament and a second filament, said electronic circuit comprises a polarity discriminator whereby electrical quantities of a first polarity are connected to said first filament and electrical quantities of a second polarity are connected to said second filament.

4. The combination recited in claim 3 wherein said bulb has a base and said polarity discriminator is disposed in said base.

5. The combination recited in claim 4 wherein said polarity discriminator is supported on said traffic signal separate from said bulb.

6. The traffic signal recited in claim 1 wherein said switching means is connected directly to said filaments.

7. A traffic signal comprising a generally pear shaped glass bulb having a large end and a small end and a principal axis extending from said large end to said small end, a first filament and a second filament disposed in spaced, generally parallel, relation to each other and supported in said bulb adjacent said large end, said first and said second filaments being disposed generally in a plane normal to said principal axis, a concave reflector having a major axis, said major axis being generally parallel to said principal axis and a control circuit adapted to be connected to said filaments, said bulb being adapted to be supported with said principal axis generally parallel to said major axis of said reflector, said control circuit having means to energize said filaments alternately whereby said first filament is energized for a first predetermined period of time while said second filament is de-energized for said first predetermined period of time and said second filament is energized for a second predetermined period of time while said first filament is de-energized for said second predetermined period of time whereby light from said filaments is reflected by said reflector in a first pattern and then in a second pattern giving the visual effect of scanning.

8. The traffic signal recited in claim 7 wherein said control circuit comprises a bi-polar switching means.

9. The traffic signal recited in claim 7 wherein said traffic signal includes a cruved reflector having a center of curvature and said bulb is supported on the side of said curved reflector adjacent said center of curvature whereby light from said filaments reflect from said reflector in patterns giving an illusion of scanning.

10. A traffic signal comprising a generally pear shaped glass bulb having a large end and a small end and a principal axis extending from said large end to said small end, a first filament and a second filament disposed in spaced, generally parallel, relation to each other and supported in said bulb adjacent said large end, said first and said second filaments being disposed generally in a plan normal to said principal axis, a concave reflector having a major axis, said major axis being generally parallel to said principal axis and a control circuit adapted to be connected to said filaments, said bulb being adapted to be supported with said principal axis generally parallel to said major axis of said reflector, said control circuit having means to energize said filaments alternately whereby said first filament is energized for a first predetermined period of time while said second filament is de-energized for said first predetermined period of time and said second filament is energized for a second predetermined period of time while said first filament is de-energized for said second predetermined period of time whereby light from said filaments is reflected by said reflector in a first pattern and then in a second pattern giving the visual effect of scanning.

said bulb has a base attached to said small end and said control circuit comprises a first diode and a second didoe, said diode being disposed within said base.

11. A traffic signal comprising a generally pear shaped glass bulb having a large end and a small end and a principal axis extending from said large end to said small end, a first filament and a second filament disposed in spaced, generally parallel, relation to each other and supported in said bulb adjacent said large end, said first and said second filaments being disposed generally in a plane normal to said principal axis, a concave reflector having a major axis, said major axis being generally parallel to said principal axis and a control circuit adapted to be connected to said filaments, said bulb being adapted to be supported with said principal axis generally parallel to said major axis of said reflector, said control circuit having means to energize said filaments alternately whereby said first filament is energized for a first predetermined period of time while said second filament is de-energized for said first predetermined period of time and said second filament is energized for a second predetermined period of time while said first filament is de-energized for said second predetermined period of time whereby light from said filaments is reflected by said reflector in a first pattern and then in a second pattern giving the visual effect of scanning, said polarity discriminator comprises a first diode and a second diode, each said diode having an anode and a cathode, said anode of said first diode and said cathode of said second diode being connected together and connected to a timing circuit, said cathode of said first diode being connected to said first filament, said anode of said second diode being connected to said second filament.

12. A traffic signal comprising a generally pear shaped glass bulb having a large end and a small end and a principal axisw extending from said large end to said small end, a first filament and a second filament disposed in spaced, generally parallel, relation to each other and supported in said bulb adjacent said large end, said first and said second filaments being disposed generally in a plane normal to said principal axis, a concave reflector having a major axis, said major axis being generally parallel to said principal axis and a control circuit adapted to be connected to said filaments, said bulb being adapted to be supported with said principal axis generally parallel to said major axis of said reflector, said control circuit having means to energize said filaments alternately whereby said first filament is energized for a first predetermined period of time whiel said second filament is de-energized for said first predetermined period of time and said second filament is energized for a second predetermined period of time while said first filament is de-energized for said second predetermined period of time whereby light from said filaments is reflected by said reflector in a first pattern and then in a second pattern giving the visual effect of scanning, said control circuit comprises a first SCR having an anode connected to a source power, a cathode connected to said first filament and a control element connected to a timer, a second SCR having a cathode connected to a source of power and an anode connected to said second filament, a second control element connected to said timer whereby said filaments are energized alternately and sequentially, said first filament being energized for a first interval time and said second filament being energized for a second interval time.

* * * * *

UNITED STATES PATENT AND TRADEMARK OFFICE

CERTIFICATE OF CORRECTION

PATENT NO. : 4,799,060

DATED : January 17, 1989

INVENTOR(S) : Richard D. Brugger

It is certified that error appears in the above—identified patent and that said Letters Patent is hereby corrected as shown below:

Column 1, line 7, delete ")" first occurrence and insert --(--.
Column 1, line 10, delete "bu thave" and insert --but have--.
Column 1, line 18, delete "circut" and insert --circuit--.
Column 1, line 25, delete "wihtout" and insert --without--.
Column 1, line 28, delete "origianl" and insert --original--.
Column 1, line 49, delete "reathre" and insert --rather--.
Column 1, line 50, delete "it soriginal" and insert --its original--.
Column 2, line 8, delete "ligth" and insert --light--.
Column 2, line 46, delete "diagrammatic" and insert --diagramatic--.
Col. 3, line 13, delete "schemtacially" and insert --schematically--.
Column 3, line 43, delete "powe" and insert --power--.
Column 3, line 50, delete "shaped" and insert --shapes--.
Column 3, line 52, delete "to" and insert --b--.
Column 4, line 50, delete "cruved" and insert --curved--.
Column 4, line 53, delete "aprallel" and insert --parallel--.
Column 4, line 54, delete "plan" and insert --plane--.
Column 5, line 48, delete "cruved" and insert --curved--.
Column 5, line 61, delete "plan" and insert --plane--.

UNITED STATES PATENT AND TRADEMARK OFFICE

CERTIFICATE OF CORRECTION

PATENT NO. : 4,799,060

DATED : January 17, 1989

INVENTOR(S) : Richard D. Brugger

It is certified that error appears in the above-identified patent and that said Letters Patent is hereby corrected as shown below:

Column 6, line 11, delete "." and insert --,--.
Column 6, line 14, delete "didoe" and insert --diode--.
Column 6, line 43, delete "said" and insert --a--.
Column 6, line 55, delete "axisw" and insert --axis--.
Column 7, line 5, delete "whiel" and insert --while--.

Signed and Sealed this

Thirteenth Day of June, 1989

*Attest:*

DONALD J. QUIGG

*Attesting Officer*

*Commissioner of Patents and Trademarks*